(12) United States Patent
Kukreja et al.

(10) Patent No.: US 12,641,061 B1
(45) Date of Patent: May 26, 2026

(54) HYBRID NETWORK DIRECTORY SERVICE

(71) Applicant: Amazon Technologies, Inc., Seattle, WA (US)

(72) Inventors: Dinesh Ramesh Kukreja, Lynnwood, WA (US); Ameya Chikodi, Seattle, WA (US); Gurveer Singh Pahuja, Seattle, WA (US); Dennis Rothmel, Westminster, CO (US); Joseph Donald Demate, Sammamish, WA (US); Ashish Kumar, Renton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 253 days.

(21) Appl. No.: 18/620,095

(22) Filed: Mar. 28, 2024

(51) Int. Cl.
*H04L 9/40* (2022.01)

(52) U.S. Cl.
CPC .......... *H04L 63/0272* (2013.01); *H04L 63/08* (2013.01)

(58) Field of Classification Search
CPC ........................... H04L 63/0272; H04L 63/08
See application file for complete search history.

(56) References Cited

U.S. PATENT DOCUMENTS

| | | | | |
|---|---|---|---|---|
| 9,942,270 | B2 * | 4/2018 | Vissamsetty | ........ H04L 63/1491 |
| 11,470,047 | B1 * | 10/2022 | Shevade | ............. H04L 12/4641 |
| 2014/0230042 | A1 * | 8/2014 | Moore | .................... H04L 63/02 726/12 |
| 2015/0281225 | A1 * | 10/2015 | Schoen | ................... H04L 63/08 726/9 |
| 2017/0118247 | A1 * | 4/2017 | Hussain | ................. H04L 41/28 |
| 2018/0367530 | A1 * | 12/2018 | Mistry | ................ H04L 63/0823 |
| 2020/0117498 | A1 * | 4/2020 | Unnikrishnan | ......... G06F 21/53 |

OTHER PUBLICATIONS

"Use DNS Policy for Split-Brain DNS in Active Directory", downoaded from <https://learn.microsoft.com/en-us/windows-server/networking/dns/deploy/dns-sb-with-ad> on Mar. 28, 2024, 7 pages.

* cited by examiner

*Primary Examiner* — Gil H. Lee
(74) *Attorney, Agent, or Firm* — Nicholson DeVos Webster & Elliott LLP

(57) ABSTRACT

Techniques for a hybrid network directory service are described. Messages forming a request to launch an instance within a cloud provider network are received, the messages including an identifier of a customer virtual network within the cloud provider network, the customer virtual network having connectivity to another network outside of the cloud provider network, the other network outside of the cloud provider network having a directory service. An instance is launched, the instance having connectivity to the customer virtual network. A server of the directory service on the other network outside of the cloud provider network is identified. The identified server is caused to add the instance as a node of the directory service. Directory service data received from the identified server is stored. Directory service requests originating from the customer virtual network are processed.

20 Claims, 8 Drawing Sheets

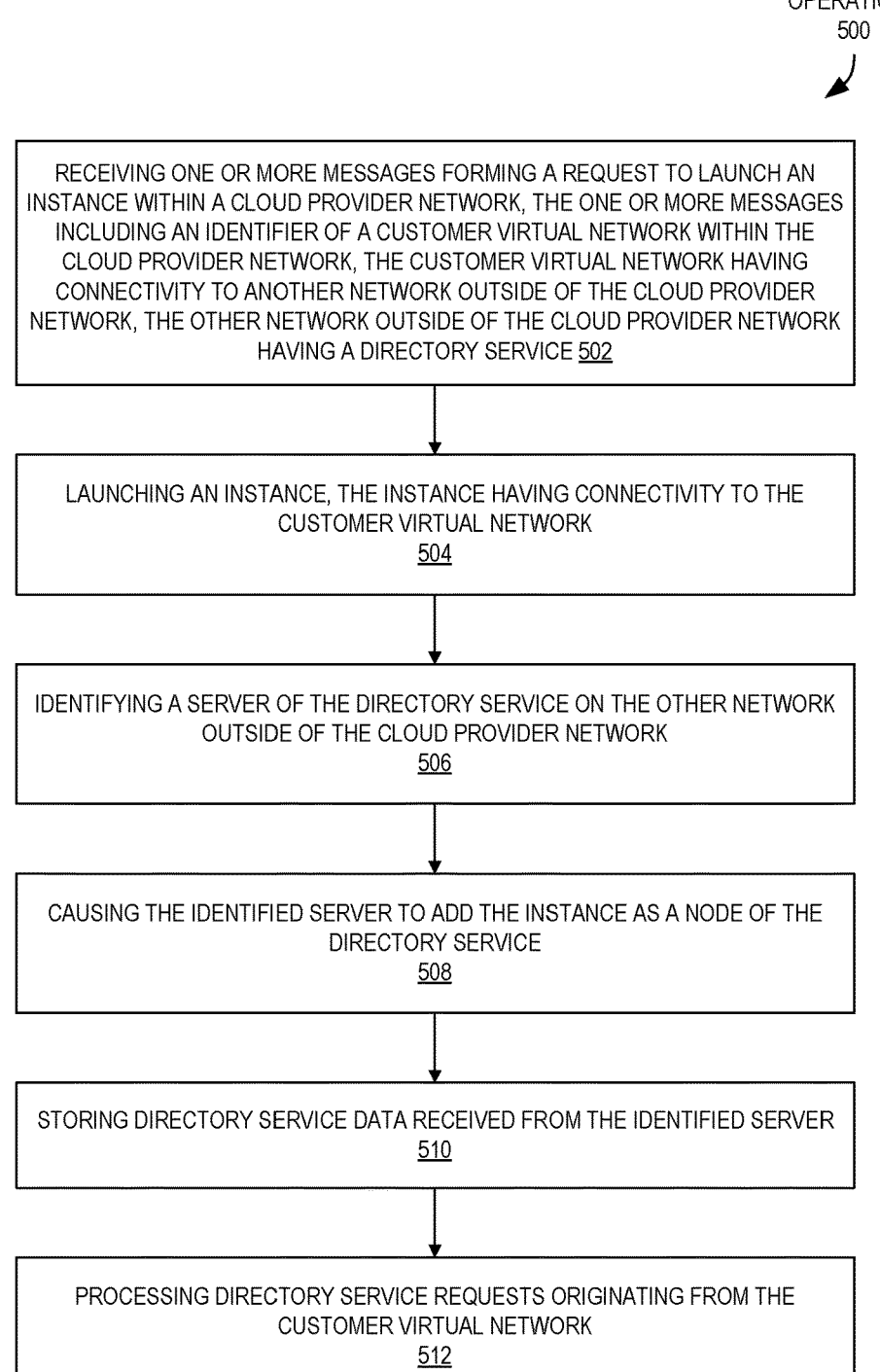

OPERATIONS
500

RECEIVING ONE OR MORE MESSAGES FORMING A REQUEST TO LAUNCH AN INSTANCE WITHIN A CLOUD PROVIDER NETWORK, THE ONE OR MORE MESSAGES INCLUDING AN IDENTIFIER OF A CUSTOMER VIRTUAL NETWORK WITHIN THE CLOUD PROVIDER NETWORK, THE CUSTOMER VIRTUAL NETWORK HAVING CONNECTIVITY TO ANOTHER NETWORK OUTSIDE OF THE CLOUD PROVIDER NETWORK, THE OTHER NETWORK OUTSIDE OF THE CLOUD PROVIDER NETWORK HAVING A DIRECTORY SERVICE 502

LAUNCHING AN INSTANCE, THE INSTANCE HAVING CONNECTIVITY TO THE CUSTOMER VIRTUAL NETWORK
504

IDENTIFYING A SERVER OF THE DIRECTORY SERVICE ON THE OTHER NETWORK OUTSIDE OF THE CLOUD PROVIDER NETWORK
506

CAUSING THE IDENTIFIED SERVER TO ADD THE INSTANCE AS A NODE OF THE DIRECTORY SERVICE
508

STORING DIRECTORY SERVICE DATA RECEIVED FROM THE IDENTIFIED SERVER
510

PROCESSING DIRECTORY SERVICE REQUESTS ORIGINATING FROM THE CUSTOMER VIRTUAL NETWORK
512

*FIG. 5*

HYBRID NETWORK DIRECTORY SERVICE

BACKGROUND

Cloud computing environments often provide on-demand, managed computing resources to customers. Such computing resources (e.g., compute and storage capacity) are often provisioned from large pools of capacity installed in data centers. Customers can request computing resources from the "cloud," and the cloud can provision compute resources to those customers. Technologies such as virtual machines and containers are often used to allow customers to securely share capacity of computer systems.

Directory services are software applications or network services that store, organize, and provide access to information in a directory. The directory typically contains information about users, groups, devices, and resources within a network or computing environment. One purpose of a directory service is to facilitate the management and organization of these entities, making it easier for users and administrators to locate and access the resources they need. One of the most well-known directory services is Active Directory, commonly used in Windows environments. Other examples include OpenLDAP, eDirectory, and Red Hat Directory Server. Directory services are often key components in enterprise environments, providing a centralized and organized way to manage and access information within a network.

BRIEF DESCRIPTION OF DRAWINGS

Various examples in accordance with the present disclosure will be described with reference to the drawings, in which:

FIG. 5 is a flow diagram illustrating operations of a method for a hybrid network directory service according to some examples.

DETAILED DESCRIPTION

The present disclosure relates to methods, apparatus, systems, and non-transitory computer-readable storage media for hybrid network directory services. According to some examples, a hybrid network directory service (or just "hybrid directory service") allows customers to provide low-latency directory services to users and applications in both cloud-based and on-premises environments. As used herein, "hybrid" or "hybrid network" refers to the directory service spanning—e.g., with replicas in both—a cloud-based network and a customer's on-premises network. Having a common directory service across on-premises and cloud-based environments can provide customers with higher availability and lower latency to cloud-based applications.

A service that provides a hybrid directory service (or a hybrid "directory service" service, abbreviated "hybrid DS service" for clarity) allows cloud-customers to replicate their existing directory services into cloud-based resources to have a directory service that spans their on-premises and cloud networks. Establishing a cloud-based replica of a customer's existing directory service provides low-latency access to cloud-based users or applications while other external users or applications can continue to access the directory via on-premises networks. Rather than send cloud-based applications to on-premises directory services or on-premises applications to cloud-based directory services, each can use an in-kind directory service: cloud-based applications can communicate with cloud-based resources providing the directory service and on-premises applications can communicate with on-premises based resources providing the directory service.

To self-manage a directory service across on-premises and the cloud, organizations have to plan and deploy more infrastructure, redesign monitoring and patching solutions, as well as develop maintenance tooling and processes in order to achieve a resilient and available directory. These already difficult and costly challenges are amplified for organizations with large global directories, as they incorporate the deployment, resiliency, disaster recovery, and support need of each region. The hybrid DS service can provide such organizations with a cloud-based solution to take over part of their directory service platform and manage maintenance, patching, resiliency, recovery, and the like.

Additionally, by establishing replication from existing on-prem directory service servers to cloud-based resources, the hybrid DS service provides a streamlined migration pathway to the cloud in the event those customers are decommissioning on-premises services or equipment.

Figure 1:
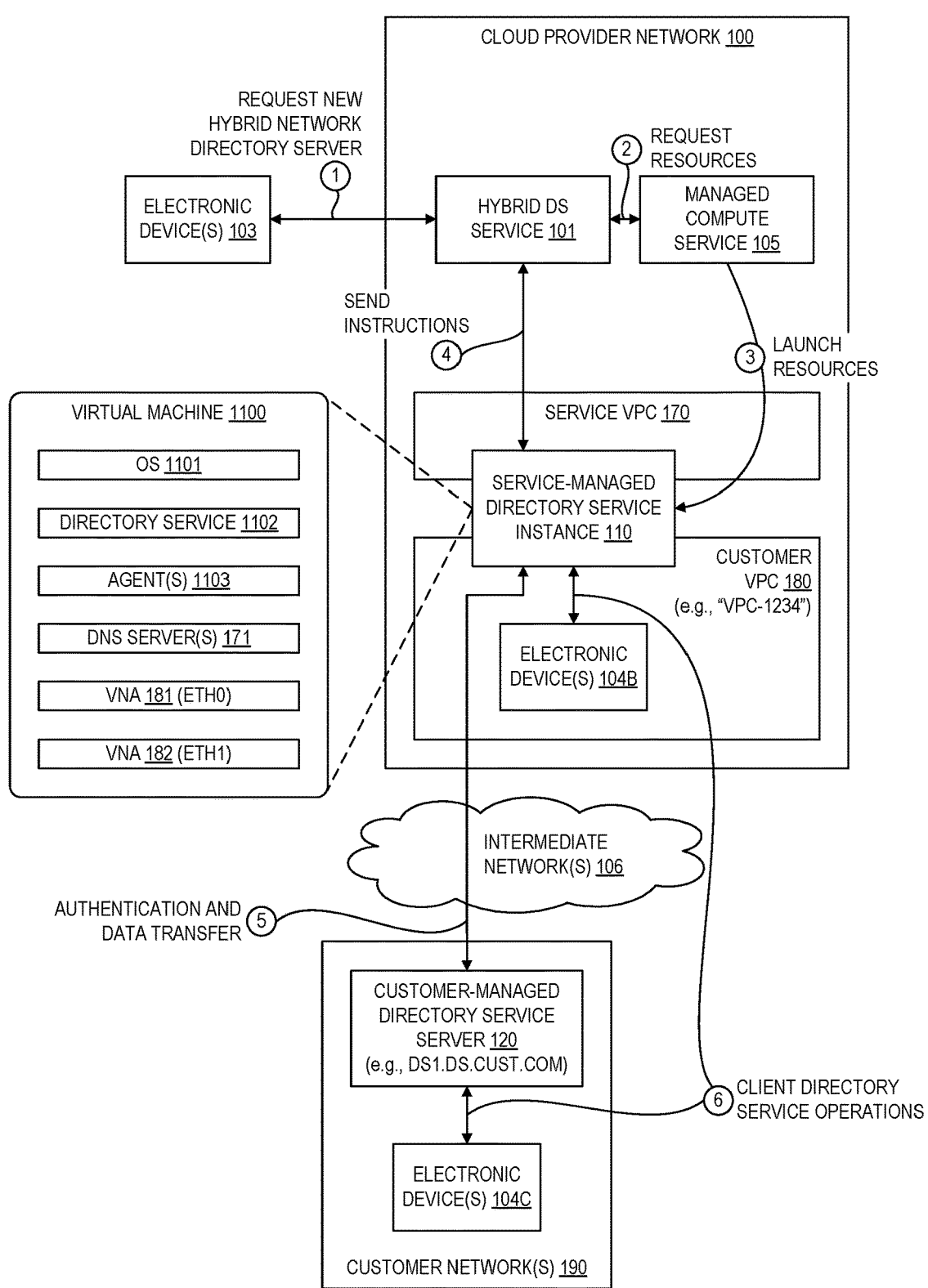
FIG. 1 is a diagram illustrating an environment for a hybrid network directory service according to some examples.

FIG. 1 is a diagram illustrating an environment for a hybrid network directory service according to some examples. A cloud provider network 100 (also referred to herein as a provider network, service provider network, etc.) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of cloud provider networks 100 can use one or more user accounts that are associated with a customer account, though these terms can be used somewhat interchangeably depending upon the context of use. Cloud provider networks are sometimes "multi-tenant" as they can provide services to multiple different customers using the same physical computing infrastructure; for example, virtual machine instances may be concurrently hosted for different customers using a same underlying physical host computing device.

Electronic devices can interact with a cloud provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the cloud provider network 100 that includes "backend" services supporting and enabling the services that can be more directly offered to customers.

Thus, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

To provide these and other computing resource services, cloud provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

As described herein, one type of service that a provider network may provide may be referred to as a "managed compute service" that executes code or provides computing resources for its users in a managed configuration. Examples of managed compute services include, for example, a hardware virtualization service, an on-demand code execution service, a container service, or the like.

A hardware virtualization service (referred to in various implementations as an elastic compute service, a virtual machines service, a computing cloud service, a compute engine, or a cloud compute service) can enable users of the cloud provider network 100 to provision and manage compute resources such as virtual machine instances. Virtual machine technology can use one physical server to run the equivalent of many servers (each of which is called a virtual machine), for example using a hypervisor, which can run at least partly on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

An on-demand code execution service (referred to in various examples as a function compute service, functions service, cloud functions service, functions as a service, or serverless computing service) can enable users of the cloud provider network 100 to execute their code on cloud resources without having to select or manage the underlying hardware resources used to execute the code. For example, a user can use an on-demand code execution service by uploading their code and use one or more APIs to request that the service identify, provision, and manage any resources required to run the code. Thus, in various examples, a "serverless" function can include code provided by a user or other entity-such as the provider network itself—that can be executed on demand. Serverless functions can be maintained within the provider network by an on-demand code execution service and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the cloud provider network 100. In some examples, these resources can be maintained in a "ready" state (e.g., having a pre-initialized runtime environment configured to execute the serverless functions), allowing the serverless functions to be executed in near real-time.

Another type of managed compute service can be a container service, such as a container orchestration and management service (referred to in various implementations as a container service, cloud container service, container engine, or container cloud service) that allows users of the cloud provider network to instantiate and manage containers. In some examples the container service can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

A virtual private cloud (VPC) (also referred to as a virtual network (VNet), virtual private network, or virtual cloud network, in various implementations) is a custom-defined, virtual network within another network, such as a cloud provider network. A VPC can be defined by at least its address space, internal structure (e.g., the computing resources that comprise the VPC, security groups), and transit paths, and is logically isolated from other virtual networks in the cloud.

A VPC can provide the foundational network layer for a cloud service, for example a compute cloud or an edge cloud, or for a customer application or workload that runs on the cloud. A VPC can be dedicated to a particular customer account (or set of related customer accounts, such as different customer accounts belonging to the same business organization). Customers can launch resources, such as compute instances, into their VPC(s). When creating a VPC, a customer can specify a range of IP addresses for the VPC in the form of a Classless Inter-Domain Routing (CIDR) block. After creating a VPC, a customer can add one or more subnets in each availability zone or edge location associated with its region.

The hybrid DS service 101 provides customers with the ability to launch cloud-based directory service servers that can join with other directory service servers hosted in the customers' on-premises networks. Directory services can be provided by a distributed group of nodes. Nodes can refer to directory service software such as Active Directory, OpenLDAP, eDirectory, Red Hat Directory Server, or the like running on cloud- or customer-compute resources in virtualized or non-virtualized environments. For example, customer networks may connect and span multiple physical sites. Directory service servers running on hardware located some or all of those locations can provide lower latency access to client devices at those locations. The servers can synchronize directory data to provide consistency across locations when directory data is changed. The hybrid DS service 101 can thus provide for addition of a cloud-hosted and service-managed directory service instance to an existing customer directory service, with the directory service thus having at least two nodes: one at a customer-managed or other external site and another within the cloud provider network and managed by the hybrid DS service 101. To provide a specific example, in Active Directory, the hybrid DS service 101 allows customers to launch domain controllers that can replicate directory data with on-premises domain controllers and service requests from cloud-based clients.

The hybrid DS service 101 launches DS instances (e.g., as a container instance, a virtual machine instance, or other compute resource). The launched DS instances are typically managed by the hybrid DS service 101 and thus referred to as service-managed DS instances. These service-managed DS instances can be considered part of the hybrid DS service 101 and can communicate with the customer's on-premises network(s). Note that the hybrid DS service 101 may launch the instances indirectly, such as via a request to a managed compute service such as those described above. The hybrid DS service 101 itself may be one or more software programs executed by resources provided by the managed compute services.

In some examples, the service-managed DS instances are launched with connectivity to at least two VPCs: a service-owned VPC to facilitate the management of the instance by the hybrid DS service 101 and a customer-owned VPC to provide the connectivity to the customer's on-premises network(s). Leveraging the service-owned VPC, the hybrid DS service 101 can offload all or a portion of the administrative burden that would otherwise be associated with customer-managed directory service hosted in the cloud (e.g., activities such as the management of infrastructure, monitoring and patching instances, etc.). The service-managed DS service instance's connectivity to the customer VPC allows the instance to communicate with other directory service servers in the customer's network and handle directory service requests traversing the customer's VPC.

An example of a hybrid network DS is illustrated in FIG. 1. As shown, a service-managed DS instance 110 and a customer-managed DS server 120 form a distributed directory service that spans the cloud provider network 100 and customer network(s) 190 (or some other third-party or other network external to the cloud provider network 100). Note that the server 120 is intended to generally represent a DS application executed on hardware within the customer network(s) 190. The application may be executed in an instance-type environment but referred to as a "server" to reduce confusion with the cloud-hosted instance 110.

An exemplary set of operations associated with forming a hybrid network directory service is now described with reference to the circled numbers 1 through 6 in FIG. 1. At circle 1, a customer such as an administrator or other user operating an electronic device 103 can cause the electronic device to send one or more messages that form a request to create a hybrid network directory server. For example, the customer may interact with a web-based interface to an API of the hybrid DS service 101. The message(s) can include various parameters to be used in the formation of the hybrid network DS. Exemplary parameters include an identification of the customer VPC having connectivity to the external network, an authentication credential to access a customer-managed DS server on that external network, an identifier of the directory service on the external network, such as a network name or address. Here, the request can include an identifier of the customer VPC 180 (e.g., vpc-1234), authentication credentials in the form of a username and password to remotely login to a directory service server on the customer network 190, and a network name of the directory service on the customer network (e.g., ds.cust.com).

At circle 2, the hybrid DS service 101 can launch a service-managed DS instance via a managed compute service 105 such as described above. In this example, the hybrid DS service 101 leverages a hardware virtualization to launch a virtual machine instance 1100, described in further detail below. The hybrid DS service 101 can provide the managed compute service 105 with an identification of machine image that can be used to launch the virtual machine, as well as with the various parameters to be used in configuration the instance, such as an identification of the VPCs 170 and 180 to which to connect the instance to (e.g., via virtual network adapters). In some examples, the service VPC 170 may be created as part of the launch request, with a per-customer service VPC providing the hybrid DS service 101 with connectivity to service-managed DS instances. In other examples, the service VPC 170 may be an existing service VPC in which service-managed DS instances of different customers are launched.

At circle 3, the managed compute service 105 launches the requested resource(s). Briefly, such operations can include identifying an underlying host computer system with the capacity to launch the instance and instructing an agent, such as a virtual machine manager, on the host computer system to launch and configure an instance per the parameters of the request at circle (2) (e.g., from a particular machine image, with the network connectivity as shown). The managed compute service 105 can return an identifier of the launched instance to the hybrid DS service 101.

In some examples, the hybrid DS service 101 track the hybrid network directory services of various customers in metadata (not shown) such as in a database or other data store. Exemplary metadata can include identifiers of hybrid network directory services, identifiers of each service-managed instance associated with a hybrid network DS, parameters of each service-managed instance (e.g., customer and service VPCs, network addresses, software version data, etc.), the customer directory service name, and customer directory service authentication credentials. The hybrid DS service 101 can use the metadata as part of managing the cloud-based portion of the directory service, such as in performing software update or patching operations, failure recovery (e.g., launching instances to replace instances that have failed for some reason), or directory service operations through a cloud-based management console provided to customers to allow operations such as the addition or removal of directory objects, changing object attributes, etc.

An exemplary service-managed DS instance 110 can be a virtual machine, such as the virtual machine 1100. The virtual machine 1100 can include an operating system 1101, such as Windows or Linux, directory service software 1102 (e.g., Active Directory on Windows; Open LDAP on Linux), one or more agents 1103, described below, and DNS software 171. For connectivity over both a service VPC and a customer VPC such as the service VPC 170 and the customer VPC 180, the service-managed DS instance 110 can have two virtual network adapters (VNAs) 181, 182. The VNAs can be identified as devices such as eth0 and eth1 within the OS 1101, with VNA 181 providing connectivity to the service VPC 170 and VNA 182 providing connectivity to the customer VPC 180, for example.

In some examples, a service-managed DS instance 110 can execute multiple DNS software applications 171, such as Windows DNS and BIND. Multiple DNS software applications can facilitate routing of data between directory service nodes within the cloud provider network and to external networks as described below with reference to FIG. 3.

Agents 1103 can be software applications that provide various functionality. One exemplary agent is a directory service configuration agent that allows a customer to configure the directory service executed on a service-managed DS instance via the hybrid DS service 101, such as enabling or disabling features. Another exemplary agent is a directory service management agent that allows customers to make changes to the directory via the hybrid DS service 101 (e.g., adding objects such as users, computers, updating object attributes, etc.). The directory service management agent allows customers to interact with the directory data. Another exemplary agent is a DNS agent that facilitates the configuration of DNS service(s) executed by the instance. Another exemplary agent is a logging agent that logs events (e.g., such as interactions with the other agent(s), client requests, instance events, usage data, etc.) with a logging service (not shown) of the cloud provider network 100.

At circle 4, the hybrid DS service 101 sends instructions to the launched instance 110. At a high level, the instructions cause the launched instance to identify a directory service server on the customer network and to cause the identified directory service server to join or otherwise add the launched instance as a node of the directory service. The instructions can be sent, for example, as a shell script (e.g., a PowerShell script, a bash script, etc.).

In some examples, the launched instance can identify a directory service server on the customer network using a DNS (Domain Name System) query to a DNS server of the customer VPC to identify a directory service server associated with the network name (e.g., ds.cust.com) provided with the request at circle 1.

In some examples, the launched instance can probe the customer network for directory service servers and select one based on a criterion, such as the directory service server that responded to a request with the lowest latency. For example, the launched instance can use DNS to identify all of the servers with names *.dc.cust.com and send a UDP or TCP packet to measure the latency to the identified servers. In the case of an Active Directory directory service, the instructions can cause the launched instance to execute the Get-ADDomainController utility with the—discover option to probe the customer network for domain controllers (directory service servers). Based on the gathered latency data, the launched instance can select the identified directory service server with the lowest latency. If multiple directory service servers exhibit the same latency, the launched instance can take additional measurements to identify the directory service server with the lowest average latency and/or randomly select one in the event of a tie.

In the illustrated example, the launched instance 110 can identify the customer-managed DS server 120 having the name dsl.ds.cust.com and an associated network IP (internet protocol) address.

At circle 5, once a directory service server on the customer network has been identified, the instructions can cause the launched instance to remotely access the identified directory service server using the authentication credential provided with the request at circle 1. Once authenticated with the identified directory service server, the launched instance can send instructions to add itself as a node to the directory service (e.g., as a domain controller, a daemon, etc.), which may include establishing one or more logical connections between the identified server and the launched instance. In the case of Active Directory, this may be referred to as "promoting" the launched instance.

Once added to the directory service, the directory service application executing on the launched instance can begin synchronizing its local version of the directory with the identified directory service server on the customer network. In the illustrated example, the service-managed DS instance 110 can begin receiving and storing data from the customer managed DS server 120. In some examples, the directory service application 1102 executed by the service-managed DS instance 110 can issue a pull request to the customer-managed DS server 120.

At circle 6, with the service-managed DS instance 110 synchronizing a copy of the network directory and having connectivity to the customer VPC 180, the service-managed DS instance 110 can begin handling directory service requests from cloud-based origins such as electronic devices 104B. Similarly, the customer-managed DS server 120 can continue servicing directory service requests from origins within the customer network(s) 190 such as electronic devices 104C.

In some examples, the hybrid DS service 101 launches at least two service-managed DS instances in response to the request at circle 1. Such may be the case to increase the availability and/or durability of the directory service data within the cloud provider network, such as by launching a first service-managed DS instance within one availability zone of a region of the cloud provider network and a second service-managed DS instance within a different availability zone of the region. (Additional details on regions and availability zones are provided below with reference to FIG. 2.) In such cases, the hybrid DS service 101 can launch a first service-managed DS instance as a "primary" instance that can retrieve the directory data from the customer-managed DS server. Then, the hybrid DS service 101 can launch a second service-managed DS instance. Rather than have the second instance probe for a directory service server on the customer network, the hybrid DS service 101 can configure the primary instance with the identity (e.g., network address or name) of the second instance to initiate directory data replication.

Figure 2:
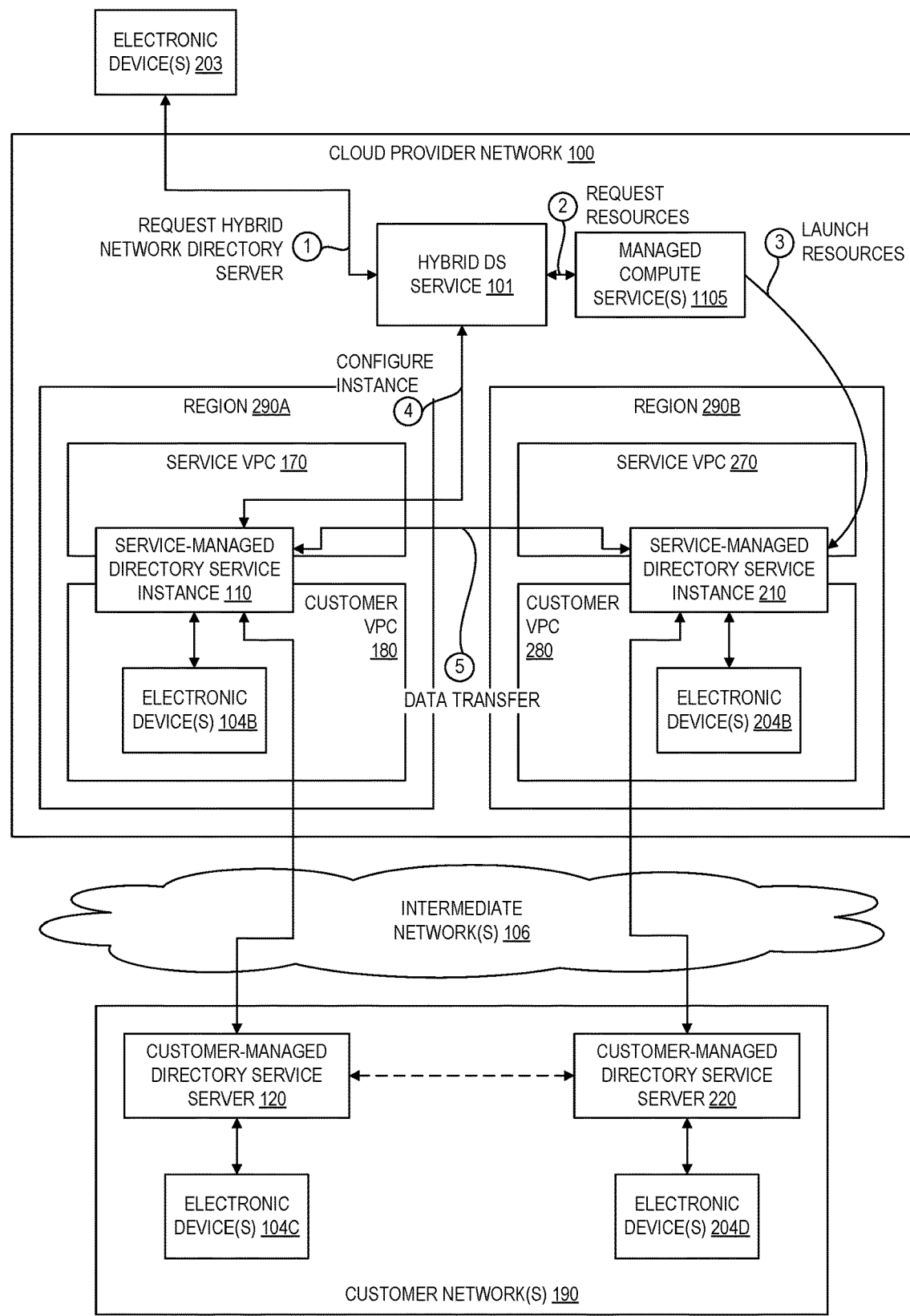
FIG. 2 is a diagram illustrating an environment for a hybrid network directory service spanning multiple geographic regions according to some examples.

FIG. 2 is a diagram illustrating an environment for a hybrid network directory service spanning multiple geographic regions according to some examples. A cloud provider network such as the cloud provider network 100 can be formed as a number of regions, where a region is a geographical area in which the cloud provider clusters data centers. Each region includes can include multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

In the illustrated example, a customer may seek to expand the cloud-hosted portion of the hybrid network directory service beyond the service-managed DS instance 110 described above. In particular, the service-managed DS instance 110 may have been launched in a region 290A of the cloud provider network, and the customer may have another VPC 280 in another region 290B with directory service clients. Expanding the directory service into additional regions would thus provide a lower latency pathway for those other clients.

An exemplary set of operations associated with expanding a hybrid network directory service is now described with reference to the circled numbers 1 through 5 in FIG. 2.

At circle 1, a customer such as an administrator or other user operating an electronic device 203 can cause the electronic device to send one or more messages that form a request to expand a hybrid network directory service. The message(s) can include various parameters to be used in the expansion of the hybrid network DS, such as an identifier of an existing hybrid DS network to be expanded, the identifier stored in the hybrid DS service 101 metadata. The message (s) can further include an identifier of the customer VPC to expand the directory service into-here VPC 280.

The operations at circles 2 and 3 can proceed as described above with reference to FIG. 1. Of note, the service-managed DS instance 210 is launched with connectivity to a service VPC 270 within the region 290B that includes the customer VPC 280 identified in the messages at circle 1.

At circle 4, the hybrid DS service 101 can update the configuration of the existing service-managed DS instances 110 to add the newly launched service-managed DS instance 210 to the directory service. Once added to the directory service, the directory service application executing on the launched instance can begin synchronizing its local version of the directory with the service-managed DS instances 110, as indicated at circle 5. With the service-managed DS instance 210 online, directory service clients such as those executed by electronic device(s) 204B within the customer VPC 280 can begin having requests serviced by the service-managed DS instance 210.

Note that in the illustrated example, the cloud-hosted DS instances transfer data via the service VPCs 170 and 280. Leveraging service VPCs can reduce the risk of a customer changing a configuration of one of their customer-managed VPCs (e.g., 180, 280) that breaks the communication pathway. Additional details on networking configuration to support transfer via service VPCs are provided with reference to FIG. 3. In other examples, cloud-hosted DS instances can transfer data via the customer VPCs.

In some examples, the one or more messages can include a flag to indicate that the launched service-managed DS instance 210 should attempt to identify other customer-managed DS servers within the customer network(s) 190. In such a case, the hybrid DS service 101 can instruct the service-managed DS instance 210 as described for the operations at circle 4 and 5 of FIG. 1. For example, the service-managed DS instance 210 can identify and join with a customer-managed DS server 220 serving electronic devices 204D. In this manner, the directory service can build out alternative data replication pathways such that the customer-managed DS servers 120 and 220 can continue to synchronize data via the cloud provider network 100 even if the connectivity between them (as indicated by the dashed line) is interrupted. These "vertical" connections in the hybrid network between customer-managed DS servers in the customer networks 190 and service-managed DS instances in the cloud provider network can additionally facilitate migration efforts, reducing the complexity of decommissioning directory service nodes within the customer networks 190.

Figure 3:
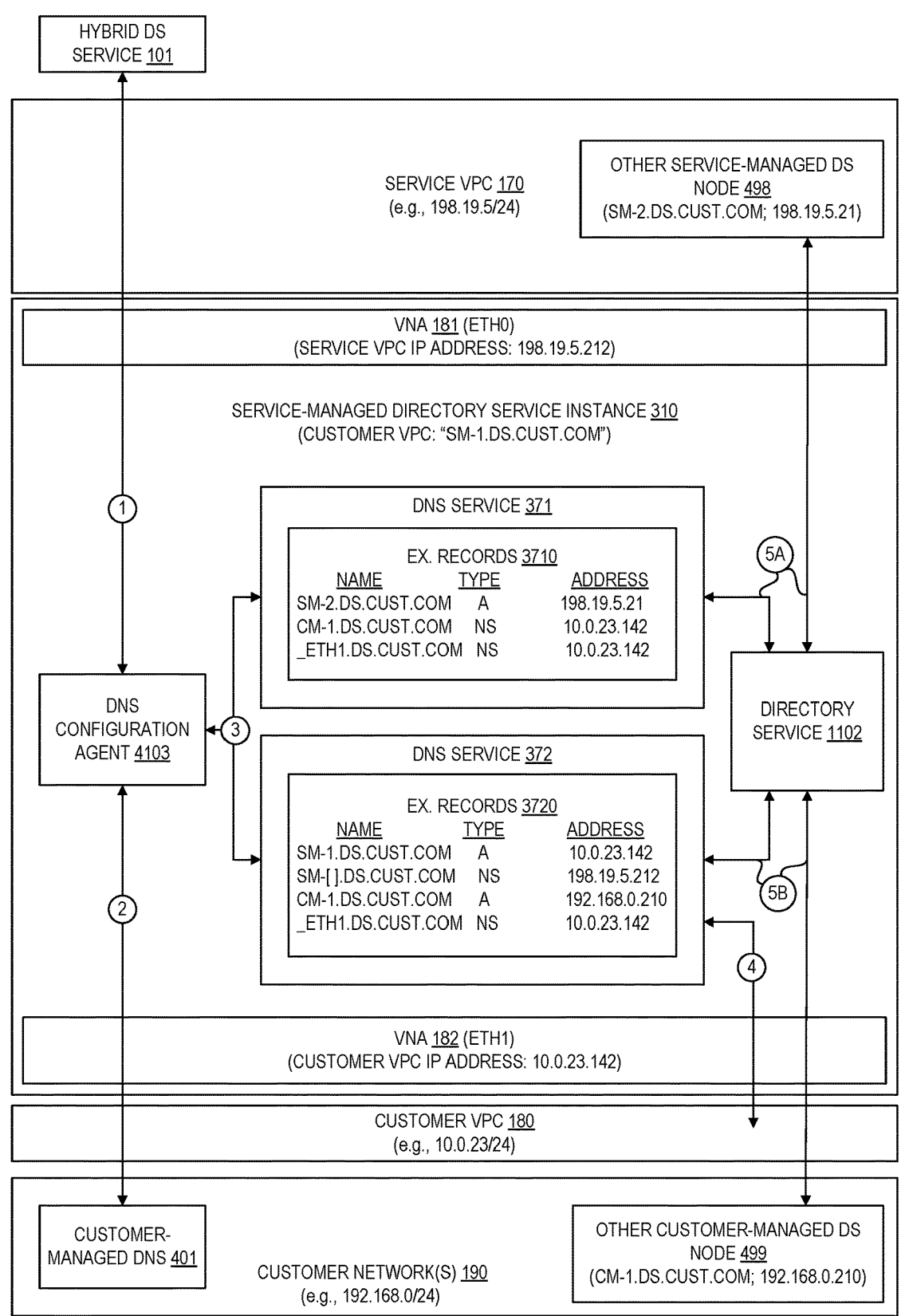
FIG. 3 is a diagram illustrating domain name resolution services in a hybrid network directory service according to some examples.

FIG. 3 is a diagram illustrating domain name resolution services in a hybrid network directory service according to some examples. To route node-to-node (e.g., domain controller to domain controller) communications between service-managed DS instances over the service-controlled VPCs (e.g., VPCs 170 and 270 in FIG. 2), the service-managed DS instances can execute multiple DNS services (sometimes referred to as servers). At a high level, requests originating from the directory service application (e.g., directory service 1102) executing in the same environment as the DNS services and naming other service-managed directory service nodes are directed to addresses on the service VPC 170, while requests naming customer-managed directory service nodes are directed to addresses on the external, customer network(s) 190. In the illustrated example, a service-managed DS instance 310 executes a DNS service 371 and a DNS service 372, which may be BIND and Windows DNS, respectively.

An exemplary set of operations associated with name resolution operations is now described with reference to circles 1 through 5 in FIG. 3. In this example, the directory service application 1102 executed by the service-managed DS instance 310 is assumed to have an internal configuration peering it with another service-managed DS instance (or node) 498 and with a customer-managed DS server (or node) 499. The service-managed DS instance 498 has a service VPC network name of sm-2.ds.cust.com and address 198.19.5.21 on the service VPC 170. The customer-managed DS server 499 has the name cm-1.ds.cust.com and address 192.168.0.210 on the customer network 190. The service-managed DS instance 310 itself has a service VPC network name of sm-1.ds.cust.com and address of 198.19.5.212 (via VNA 181) and an address of 10.0.23.142 on the customer VPC 180 (via the VNA 182). Address blocks are assigned to the various networks (or subnets) as indicated with the slash notation.

At circle 1, the hybrid DS service 101 sends one or more messages to a DNS configuration agent 4103 to cause the agent 4103 to configure the DNS services 371 and 372 executed by the instance 310. Configuration can include updating the zone files and/or records of the respective services. The hybrid DS service 101 can provide the names and addresses of the other service-managed DS nodes, such as sm-2.ds.cust.com. The hybrid DS service 101 can provide the names of the other customer-managed DS nodes, such as cm-1.ds.cust.com (which may be included in the request to create the hybrid DS.)

At circle 2, the DNS configuration agent 4103 requests the network addresses associated with the various customer-managed DS nodes from a DNS 401 of the customer network 190. At circle 3, using the addressing information received from the customer DNS 401 and the provided service-managed DS node network name and address data, the DNS configuration agent 4103 updates the configuration of the DNS services 371 and 372. An exemplary set of records 3710 and 3720 are respectively illustrated for DNS services 371 and 372.

Records 3710 of the DNS service 371 resolve names to service-managed DS nodes to their corresponding service VPC addresses and names of customer-managed DS nodes to the DNS service 372. Records 3720 of the DNS service 372 resolve the name of the instance 310 to its corresponding address on the customer VPC 180, names of any other service-managed DS nodes to the DNS service 371, and names of customer-managed DS nodes to their corresponding addresses on the customer network 190.

In this configuration, the DNS service 372 will direct applications (e.g., directory service clients) communicating via the customer VPC 180 to the instance 310 on the customer VPC 180 as indicated at circle 4.

At circle 5A, the directory service application 1102 will attempt to resolve other DS node names with the DNS service 371. If the request is for a service-managed DS node (e.g., sm-1), the DNS service 371 will resolve the name to a service VPC address and direct the application 1102 accordingly. If the request is for a customer-managed DS node, the DNS service 371 will direct the application 1102 to the DNS service 372. At circle 5B, the application 1102 will attempt to resolve the customer-managed DS node name with the DNS service 372, which in turn will resolve the name to a customer network address and direct the application 1102 accordingly. In this manner, node-to-node traffic between service-managed DS instances traverses the service VPC, while node-to-node traffic between a service-managed DS instance and a customer-managed DS server traverses the customer VPC.

Figure 4:
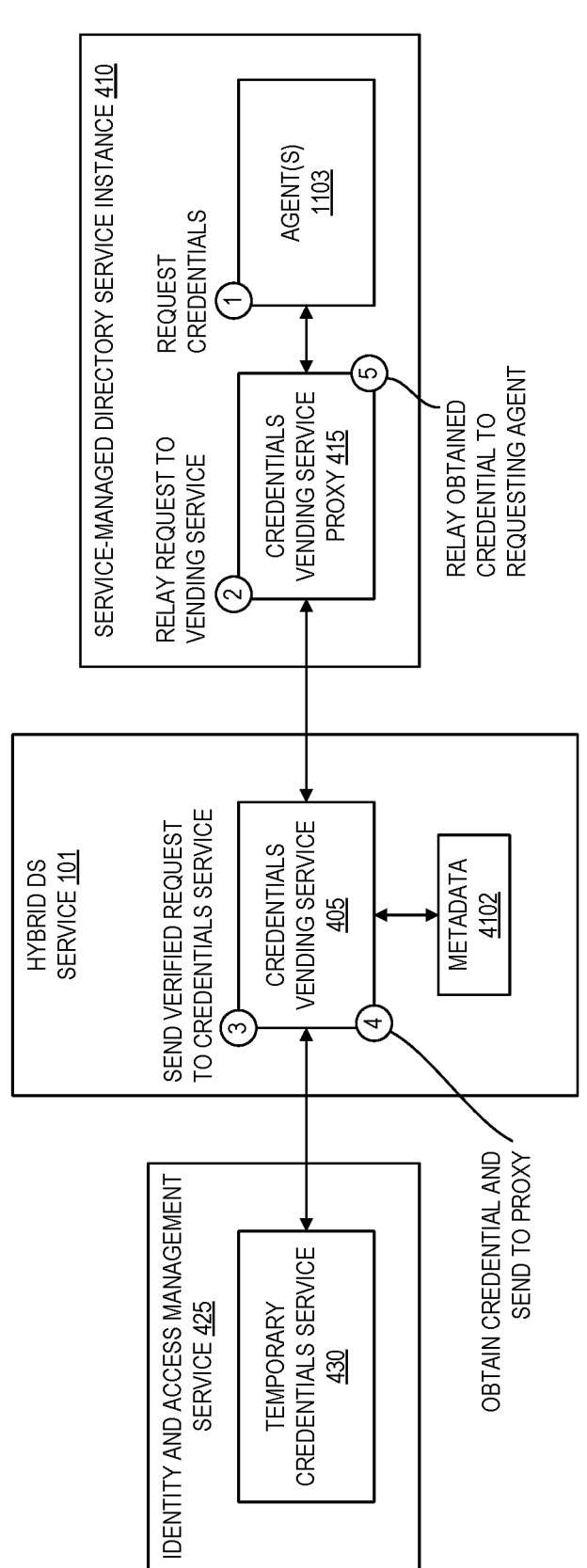
FIG. 4 is a diagram illustrating credentials distribution in a hybrid network directory service according to some examples.

FIG. 4 is a diagram illustrating credentials distribution in a hybrid network directory service according to some examples. Customers who have launched hybrid network directory services may be provided with credentials to access service-managed DS instances to perform operations such as configuring or managing their directory service via the cloud-hosted nodes. Providing access to instances with connectivity to a service VPC can pose security risks-customers may intentionally or unintentionally access or modify other resources on the service VPC. While limiting the set of permissions associated with the role accessed with the credentials can provide some degree of security (e.g., to prevent the installation or execution of software, commands, etc.), other techniques can further reduce the aforementioned security risks. In particular, the various agents executed by a service-managed DS instance can have granular sets of permissions granted per-hybrid network DS.

An exemplary set of operations associated with credentials distribution is now described with reference to the circled numbers 1 through 5 in FIG. 4. As illustrated, a service-managed DS instance 410 can include agents 1103 and a credentials vending service proxy 415. At circle 1, an agent 1103 requests a credential from the credentials vending service proxy 415, with the credentials vending service proxy 415 acting to vend credentials to agents 1103. In particular, the credentials vending service proxy 415 vends obtained credentials, the obtained credentials permitting an identified set of operations on an identified set of targets, the operations and targets circumscribed by the identity of the particular service-managed DS instance or hybrid network DS.

As agents 1103 request credentials, the credentials vending service proxy 415 can send the request along with additional data to a credentials vending service 405 of the hybrid DS service 101, as indicated at circle 2. The additional data can be source-identifying data that the credentials vending service 405 can use to verify the source of the request. For example, the additional data can be encrypted configuration data, or a signature of such data, loaded by the hybrid DS service 101 to the service-managed DS instance during post-launch configuration.

At circle 3, the credentials vending service 405 verifies the request using the additional data and, if verified, sends a credentials request to a service that issues credentials. The credentials vending service 405 can include an itemized list of data sources, sinks, and operations that should be permissible with the token, the itemized list based on the verified identity of the service-managed DS instance or of the hybrid network DS as indicated in the metadata 4102. For example, if the particular hybrid network DS logs to a particular log file with a logging service, the identification of write permissions to that log file can be included in the request to the service that issues credentials.

In this example, the credential-issuing service is a temporary credentials service 430, which may be part of an identity and access management service 425 of the cloud provider network (not shown). The temporary credentials service 430 can generate and return a time-limited token. Agents can use issued tokens to authenticate with other resources or services, such as when reading or writing data stored with services, requesting or modifying resources provided by services, etc. Other examples may use other types of credentials.

At circle 4, the credentials vending service 405 can send the received credential to the credentials vending service proxy 415, which in turn can relay the credential to the requesting agent 1103 as indicated at circle 5. Agents can send the credential with requests to other services, and those other services can verify the credential prior to responding to the request. In this manner, individual agents 1103 executed by service-managed DS instances of a particular hybrid network DS receive credentials permitting operations with other resources or services (not shown) based on their identity.

In some examples, the credentials vending service proxy 415 can cache requested credentials. Upon receiving the request for a credential from a particular agent, the credentials vending service proxy 415 can check whether the credential is cached, and, if so, return the cached credential. Otherwise, the credentials vending service proxy 415 can request the credential from the credentials vending service 405. In some examples, the credentials vending service proxy 415 can refresh cached, time-limited credentials when upon expiration, thereby reducing delays in subsequent agent requests.

FIG. 5 is a flow diagram illustrating operations of a method 500 for a hybrid network directory service according to some examples. Some or all of the operations 500 (or other processes described herein, or variations, and/or combinations thereof) are performed under the control of one or more computing devices configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 500 are performed by the hybrid DS service 101 of the other figures.

The operations 500 include, at block 502, receiving one or more messages forming a request to launch an instance within a cloud provider network, the one or more messages including an identifier of a customer virtual network within the cloud provider network, the customer virtual network having connectivity to another network outside of the cloud provider network, the other network outside of the cloud provider network having a directory service.

The operations 500 further include, at block 504, launching an instance, the instance having connectivity to the customer virtual network.

The operations 500 further include, at block 506, identifying a server of the directory service on the other network outside of the cloud provider network. For example, the Get-ADDomainController tool can be used to locate a directory server on the external network, as described herein.

The operations 500 further include, at block 508, causing the identified server to add the instance as a node of the directory service. As described herein, the instance may execute an application or script locally to remotely access the server of the directory service and then issue commands to the server to add the instance as a node of the directory service.

The operations 500 further include, at block 510, storing directory service data received from the identified server. A directory service application can replicate and synchronize directory data between the instance and the server. The received data is typically stored by the instance, such as in local memory, on a local drive, or in a storage location provided by a storage service of the cloud provider network (e.g., a database service, a block storage service, an object storage service, etc.).

The operations 500 further include, at block 512, processing directory service requests originating from the customer virtual network. For example, requests from electronic devices 104B can be processed by the launched instance.

In some examples, the operations 506 through 512 are performed by the instance. For example, the instance can remotely login to or otherwise access the server on the external network using an authentication credential, such as via a remote shell, and then issue commands via that access to modify the directory service configuration to add the instance as a node of the directory service. Once added, the instance can receive data from the server to update its view of the directory and serve as a node of directory service operating within the customer virtual network. The customer can provide the authentication credential used during this process. Exemplary credentials include a username and password, a security token, or the like.

Figure 6:
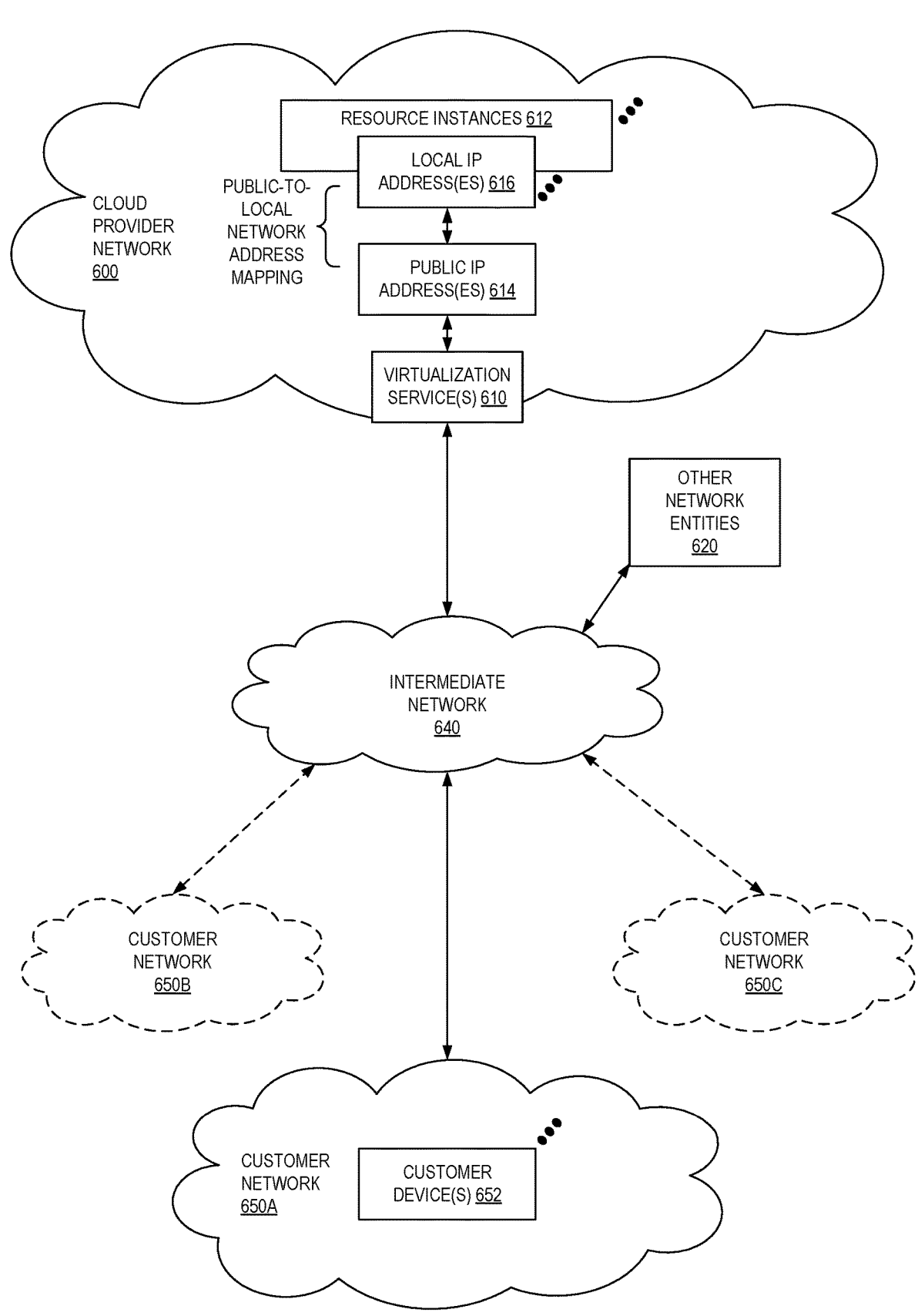
FIG. 6 illustrates an example cloud provider network environment according to some examples.

FIG. 6 illustrates an example provider network (or "service provider system") environment according to some examples. A provider network 600 can provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 can be associated with the resource instances 612; the local IP addresses are the internal network addresses of the resource instances 612 on the provider network 600. In some examples, the provider network 600 can also provide public IP addresses 614 and/or public IP address ranges (e.g., Internet Protocol version 4 (IPv4) or Internet Protocol version 6 (IPv6) addresses) that customers can obtain from the provider 600.

Conventionally, the provider network 600, via the virtualization services 610, can allow a customer of the service provider (e.g., a customer that operates one or more customer networks 650A-650C (or "client networks") including one or more customer device(s) 652) to dynamically associate at least some public IP addresses 614 assigned or allocated to the customer with particular resource instances 612 assigned to the customer. The provider network 600 can also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of the customer network(s) 650A-650C can, for example, implement customer-specific applications and present the customer's applications on an intermediate network 640, such as the Internet. Other network entities 620 on the intermediate network 640 can then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 can be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 600; a customer can then assign their allocated public IP addresses to particular resource instances allocated to the customer. These public IP addresses can be referred to as customer public IP addresses, or simply customer IP addresses. Instead of being assigned by the provider network 600 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
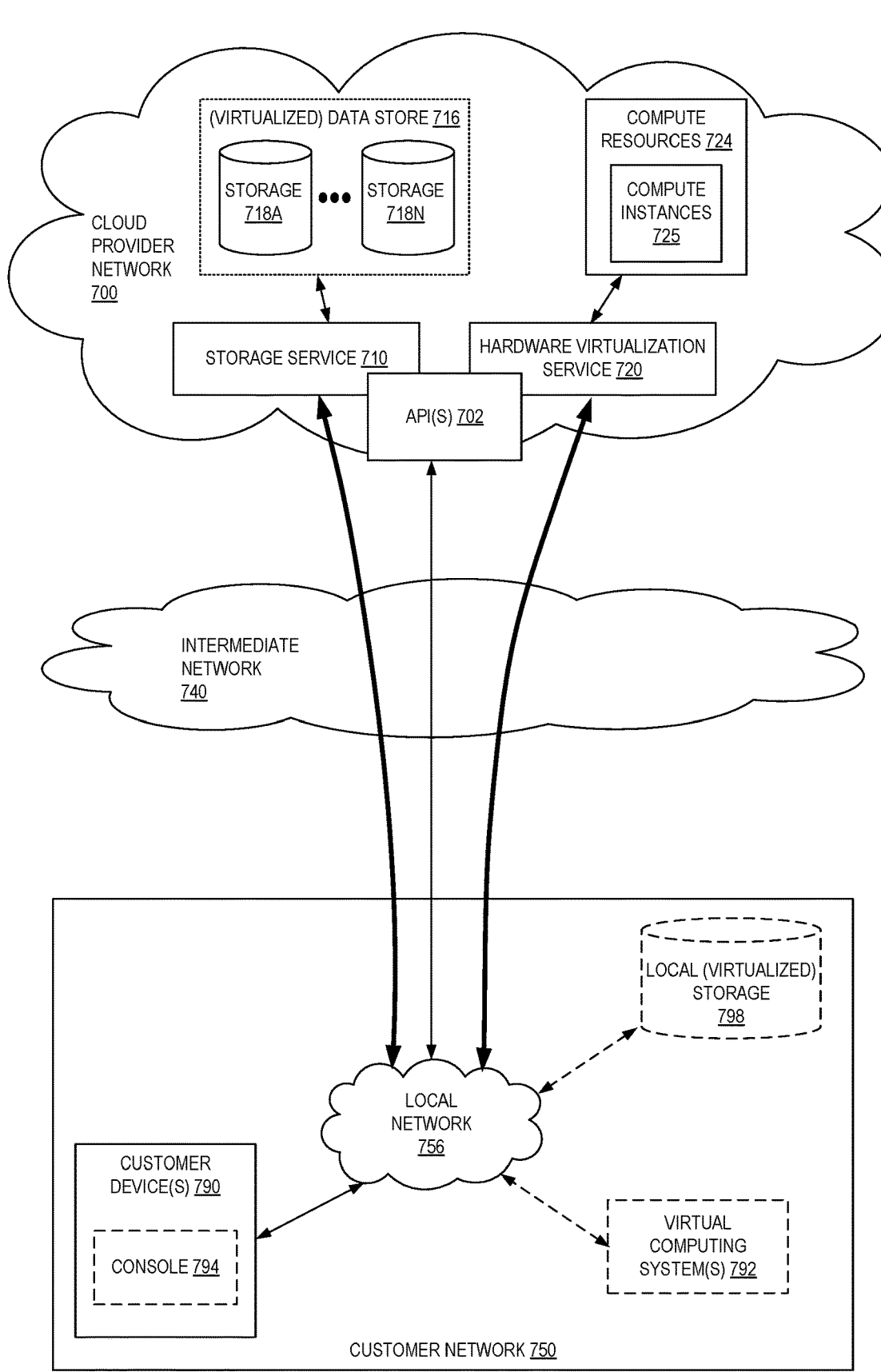
FIG. 7 is a block diagram of an example cloud provider network that provides a storage service and a hardware virtualization service to customers according to some examples.

FIG. 7 is a block diagram of an example provider network environment that provides a storage service and a hardware virtualization service to customers, according to some examples. A hardware virtualization service 720 provides multiple compute resources 724 (e.g., compute instances 725, such as VMs) to customers. The compute resources 724 can, for example, be provided as a service to customers of a provider network 700 (e.g., to a customer that implements a customer network 750). Each computation resource 724 can be provided with one or more local IP addresses. The provider network 700 can be configured to route packets from the local IP addresses of the compute resources 724 to public Internet destinations, and from public Internet sources to the local IP addresses of the compute resources 724.

The provider network 700 can provide the customer network 750, for example coupled to an intermediate network 740 via a local network 756, the ability to implement virtual computing systems 792 via the hardware virtualization service 720 coupled to the intermediate network 740 and to the provider network 700. In some examples, the hardware virtualization service 720 can provide one or more APIs 702, for example a web services interface, via which the customer network 750 can access functionality provided by the hardware virtualization service 720, for example via a console 794 (e.g., a web-based application, standalone application, mobile application, etc.) of a customer device 790. In some examples, at the provider network 700, each virtual computing system 792 at the customer network 750 can correspond to a computation resource 724 that is leased, rented, or otherwise provided to the customer network 750.

From an instance of the virtual computing system(s) 792 and/or another customer device 790 (e.g., via console 794), the customer can access the functionality of a storage service 710, for example via the one or more APIs 702, to access data from and store data to storage resources 718A-718N of a virtual data store 716 (e.g., a folder or "bucket," a virtualized volume, a database, etc.) provided by the provider network 700. In some examples, a virtualized data store gateway (not shown) can be provided at the customer network 750 that can locally cache at least some data, for example frequently accessed or critical data, and that can communicate with the storage service 710 via one or more communications channels to upload new or modified data from a local cache so that the primary store of data (the virtualized data store 716) is maintained. In some examples, a user, via the virtual computing system 792 and/or another customer device 790, can mount and access virtual data store 716 volumes via the storage service 710 acting as a storage virtualization service, and these volumes can appear to the user as local (virtualized) storage 798.

While not shown in FIG. 7, the virtualization service(s) can also be accessed from resource instances within the provider network 700 via the API(s) 702. For example, a customer, appliance service provider, or other entity can access a virtualization service from within a respective virtual network on the provider network 700 via the API(s) 702 to request allocation of one or more resource instances within the virtual network or within another virtual network.

Illustrative Systems

Figure 8:
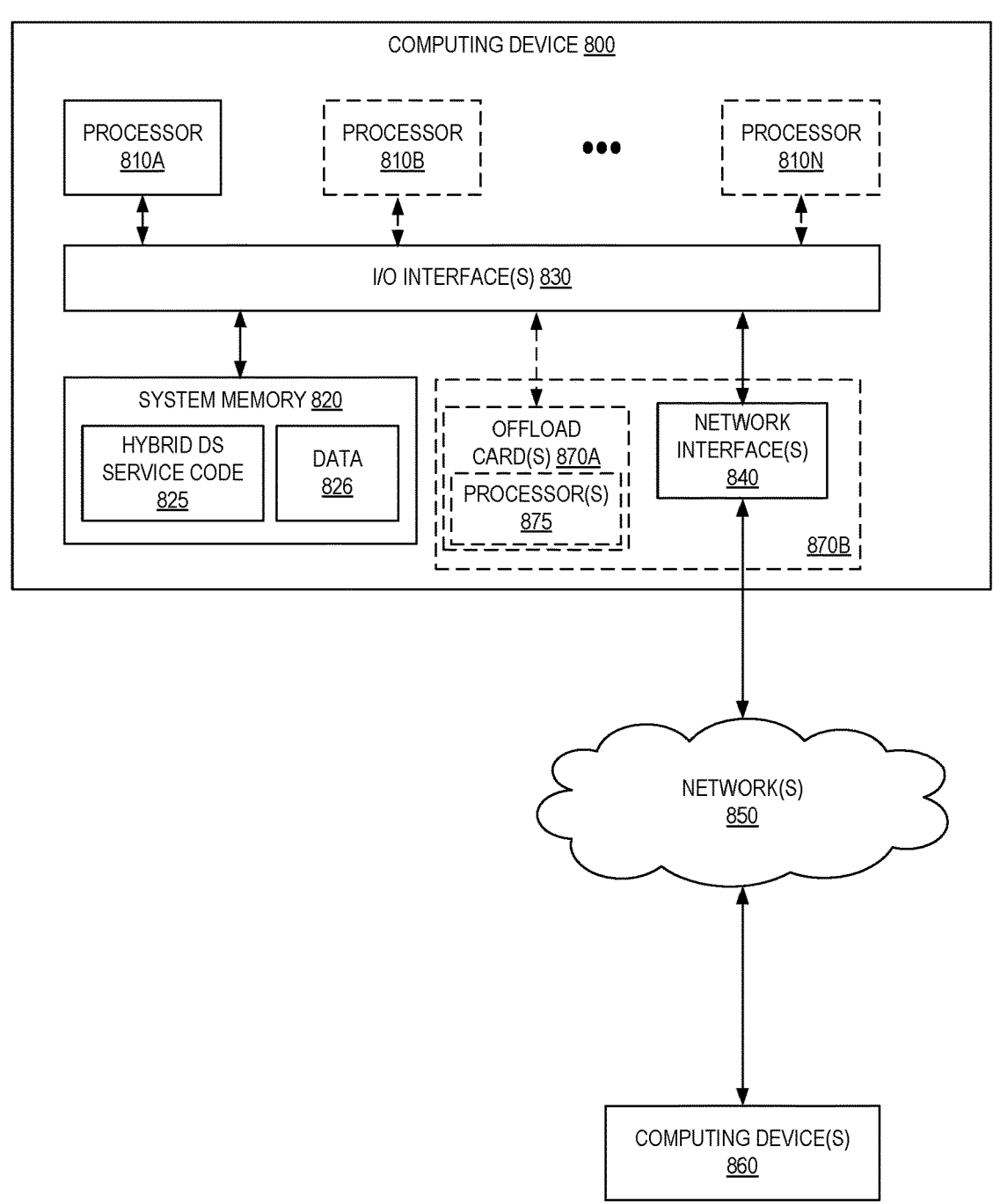
FIG. 8 is a block diagram illustrating an example computing device that can be used in some examples.

In some examples, a system that implements a portion or all of the techniques described herein can include a general-purpose computer system, such as the computing device 800 (also referred to as a computing system or electronic device) illustrated in FIG. 8, that includes, or is configured to access, one or more computer-accessible media. In the illustrated example, the computing device 800 includes one or more processors 810 coupled to a system memory 820 via an input/output (I/O) interface 830. The computing device 800 further includes a network interface 840 coupled to the I/O interface 830. While FIG. 8 shows the computing device 800 as a single computing device, in various examples the computing device 800 can include one computing device or any number of computing devices configured to work together as a single computing device 800.

In various examples, the computing device 800 can be a uniprocessor system including one processor 810, or a multiprocessor system including several processors 810 (e.g., two, four, eight, or another suitable number). The processor(s) 810 can be any suitable processor(s) capable of executing instructions. For example, in various examples, the processor(s) 810 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 810 can commonly, but not necessarily, implement the same ISA.

The system memory 820 can store instructions and data accessible by the processor(s) 810. In various examples, the system memory 820 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 820 as hybrid DS service code 825 (e.g., executable to implement, in whole or in part, the hybrid DS service 101) and data 826.

In some examples, the I/O interface 830 can be configured to coordinate I/O traffic between the processor 810, the system memory 820, and any peripheral devices in the device, including the network interface 840 and/or other peripheral interfaces (not shown). In some examples, the I/O interface 830 can perform any necessary protocol, timing, or other data transformations to convert data signals from one component (e.g., the system memory 820) into a format suitable for use by another component (e.g., the processor 810). In some examples, the I/O interface 830 can include support for devices attached through various types of peripheral buses, such as a variant of the Peripheral Component Interconnect (PCI) bus standard or the Universal Serial Bus (USB) standard, for example. In some examples, the function of the I/O interface 830 can be split into two or more separate components, such as a north bridge and a south bridge, for example. Also, in some examples, some or all of the functionality of the I/O interface 830, such as an interface to the system memory 820, can be incorporated directly into the processor 810.

The network interface 840 can be configured to allow data to be exchanged between the computing device 800 and other computing devices 860 attached to a network or networks 850, such as other computer systems or devices as illustrated in FIG. 1, for example. In various examples, the network interface 840 can support communication via any suitable wired or wireless general data networks, such as types of Ethernet network, for example. Additionally, the network interface 840 can support communication via telecommunications/telephony networks, such as analog voice networks or digital fiber communications networks, via storage area networks (SANs), such as Fibre Channel SANs, and/or via any other suitable type of network and/or protocol.

In some examples, the computing device 800 includes one or more offload cards 870A or 870B (including one or more processors 875, and possibly including the one or more network interfaces 840) that are connected using the I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some examples the computing device 800 can act as a host electronic device (e.g., operating as part of a hardware virtualization service) that hosts compute resources such as compute instances, and the one or more offload cards 870A or 870B execute a virtualization manager that can manage compute instances that execute on the host electronic device. As an example, in some examples the offload card(s) 870A or 870B can perform compute instance management operations, such as pausing and/or un-pausing compute instances, launching and/or terminating compute instances, performing memory transfer/copying operations, etc. These management operations can, in some examples, be performed by the offload card(s) 870A or 870B in coordination with a hypervisor (e.g., upon a request from a hypervisor) that is executed by the other processors 810A-810N of the computing device 800. However, in some examples the virtualization manager implemented by the offload card(s) 870A or 870B can accommodate requests from other entities (e.g., from compute instances themselves), and cannot coordinate with (or service) any separate hypervisor.

In some examples, the system memory 820 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computing device 800 via the I/O interface 830. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computing device 800 as the system memory 820 or another type of memory. Further, a computer-accessible medium can include transmission media or signals such as electrical, electromagnetic, or digital signals, conveyed via a communication medium such as a network and/or a wireless link, such as can be implemented via the network interface 840.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle(R), Microsoft(R), Sybase(R), IBM(R), etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 718A-718N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
receiving, by a service of a cloud provider network, one or more messages forming a request to launch an instance within the cloud provider network, the one or more messages including an identifier of a virtual network of a customer within the cloud provider network, the virtual network of the customer having connectivity to an external network of the customer having a directory service, the one or more messages further including an authentication credential to access the directory service;
launching an instance, the instance having connectivity to a virtual network of the service and to the virtual network of the customer; and
by the instance:
probing the external network of the customer to identify servers of the directory service,
selecting a server from the identified servers of the directory service,
authenticating, using the authentication credential, with the selected server of the directory service to cause the selected server to add the instance as a node of the directory service,
storing directory service data received from the selected server, and
processing directory service requests originating from the virtual network of the customer.

2. The computer-implemented method of claim 1, wherein the instance is a first node of the directory service managed by the service and the server is a second node of the directory service managed by the customer, and further comprising, by the instance:
directing a first domain name system (DNS) request originating from a directory service application executing on the instance and including a network name of another customer-managed directory service node to a network address on the virtual network of the customer; and
directing a second DNS request originating from the directory service application and including a network name of another service-managed directory service node to a network address on the virtual network of the service.

3. The computer-implemented method of claim 2, further comprising configuring records of at least two DNS services executed by the instance via the virtual network of the service.

4. A computer-implemented method comprising:
receiving one or more messages forming a request to launch an instance within a cloud provider network, the one or more messages including an identifier of a customer virtual network within the cloud provider network, the customer virtual network having connectivity to a second network outside of the cloud provider network, the second network outside of the cloud provider network and having a directory service;

launching an instance, the instance having connectivity to the customer virtual network;

identifying a server of the directory service on the second network outside of the cloud provider network;

causing the identified server to add the instance as a node of the directory service;

storing directory service data received from the identified server; and processing, by the instance, directory service requests originating from the customer virtual network.

5. The computer-implemented method of claim 4, wherein the instance is a first node of the directory service managed by a service and the server is a second node of the directory service managed by the customer, and further comprising:

directing a first domain name system (DNS) request originating from a directory service application executing on the instance and including a network name of another customer-managed directory service node to a network address on the customer virtual network; and directing a second DNS request originating from the directory service application and including a network name of another service-managed directory service node to a network address on another virtual network.

6. The computer-implemented method of claim 5, wherein the first DNS request is processed at least by a first DNS service executing on the instance and the second DNS request is processed at least by a second DNS service executing on the instance.

7. The computer-implemented method of claim 4, wherein the one or more messages are received by a service of the cloud provider network, the instance having connectivity to a virtual network of the service, and wherein the service sends a shell script to the instance via the virtual network of the service, the shell script causing the instance to identify the server of the directory service and cause the identified server to add the instance as the node of the directory service.

8. The computer-implemented method of claim 7, further comprising:

launching a second instance as another node of the directory service; and transferring directory service data between the instance and the second instance via the virtual network of the service.

9. The computer-implemented method of claim 8, wherein the instance is hosted within a first region of the cloud provider network and the second instance is hosted in a second region of the cloud provider network.

10. The computer-implemented method of claim 9, wherein the second instance is joined with another server of the directory service outside of the cloud provider network.

11. The computer-implemented method of claim 4, wherein the server of the directory service on the second network outside of the cloud provider network is identified based on a latency measurement between the instance and the server.

12. The computer-implemented method of claim 4, wherein the one or more messages further include an authentication credential to access the directory service, and further comprising authenticating, using the authentication credential, with the identified server.

13. A system comprising:

a first one or more computing devices to implement a service in a cloud provider network, the service including instructions that upon execution cause the service to:

receive one or more messages that form a request to launch an instance within a cloud provider network, the one or more messages including an identifier of a customer virtual network within the cloud provider network, the customer virtual network with connectivity to a second network outside of the cloud provider network, the second network outside of the cloud provider network and having a directory service, and launch an instance with connectivity to the customer virtual network; and a second one or more computing devices to execute the instance in the cloud provider network, the instance including instructions that upon execution cause the instance to:

identify a server of the directory service on the second network outside of the cloud provider network, cause the identified server to add the instance as a node of the directory service, store directory service data received from the identified server, and process directory service requests originating from the customer virtual network.

14. The system of claim 13, wherein the instance is a first node of the directory service managed by the service and the server is a second node of the directory service managed by the customer, and wherein the instance includes further instructions that upon execution cause the instance to:

direct a first domain name system (DNS) request originating from a directory service application executed on the instance and including a network name of another customer-managed directory service node to a network address on the customer virtual network; and direct a second DNS request originating from the directory service application and including a network name of another service-managed directory service node to a network address on a virtual network of the service.

15. The system of claim 14, wherein the first DNS request is processed at least by a first DNS service executed by the instance and the second DNS request is processed at least by a second DNS service executed by the instance.

16. The system of claim 13, wherein the instance and the service communicate via a virtual network of the service, and wherein the service sends a shell script to the instance via the virtual network of the service, the shell script including the instructions to cause the instance to identify the server of the directory service and to cause the identified server to add the instance as the node of the directory service.

17. The system of claim 16, wherein the service includes further instructions that upon execution cause the service to launch a second instance as another node of the directory service, and wherein the instance includes further instructions that upon execution cause the instance to transfer directory service data with the second instance via the virtual network of the service.

18. The system of claim 17, wherein the instance is hosted within a first region of the cloud provider network and the second instance is hosted in a second region of the cloud provider network.

19. The system of claim 18, wherein the second instance is joined with another server of the directory service outside of the cloud provider network.

20. The system of claim 13, wherein the server of the directory service on the second network outside of the cloud provider network is identified based on a latency measurement between the instance and the server.

\* \* \* \* \*